United States Patent
Thompson et al.

(10) Patent No.: US 11,672,250 B2
(45) Date of Patent: Jun. 13, 2023

(54) COMPOSITIONS AND METHODS FOR FORMULATING MOLTEN PETROLEUM ADJUVANTS TO IMPROVE HERBICIDAL UP-TAKE IN WEED PLANTS

(71) Applicant: OMS Investments, Inc., Los Angeles, CA (US)

(72) Inventors: Harold E. Thompson, Powell, OH (US); Robert Baker, Westerville, OH (US); Darrell Michael, Dublin, OH (US); Mark Prinster, Marysville, OH (US)

(73) Assignee: OMS Investments, Inc., Los Angeles, CA (US)

( * ) Notice: Subject to any disclaimer, the term of this patent is extended or adjusted under 35 U.S.C. 154(b) by 125 days.

(21) Appl. No.: 17/207,009

(22) Filed: Mar. 19, 2021

(65) Prior Publication Data

US 2021/0289779 A1    Sep. 23, 2021

Related U.S. Application Data

(60) Provisional application No. 62/992,218, filed on Mar. 20, 2020.

(51) Int. Cl.
| | |
|---|---|
| *A01N 27/00* | (2006.01) |
| *A01N 25/26* | (2006.01) |
| *A01N 31/02* | (2006.01) |
| *A01N 37/38* | (2006.01) |
| *A01N 37/40* | (2006.01) |

(Continued)

(52) U.S. Cl.
CPC ............. *A01N 27/00* (2013.01); *A01N 25/26* (2013.01); *A01N 31/02* (2013.01); *A01N 37/38* (2013.01); *A01N 37/40* (2013.01); *C05C 9/00* (2013.01); *C05G 3/60* (2020.02); *C05G 5/12* (2020.02)

(58) Field of Classification Search
CPC ........ A01N 27/00; A01N 25/26; A01N 31/02; A01N 37/38; A01N 37/40; C05C 9/00; C05G 3/60; C05G 5/12
See application file for complete search history.

(56) References Cited

U.S. PATENT DOCUMENTS 3,506,434 A    4/1970 Jacobi et al.

OTHER PUBLICATIONS

Mededelingen van de Faculteit landbouwwetenschappen. Rijksuniversiteit Gent. 1986, vol. 51, No. 2a, pp. 301-310 (6 pages).

(Continued)

*Primary Examiner* — Trevor Love
(74) *Attorney, Agent, or Firm* — Ulmer & Berne LLP

(57) ABSTRACT

Herbicide-adjuvant composition compositions for controlling weed plants are disclosed. A herbicide-adjuvant composition includes a phenoxy-based herbicide and a petroleum-based adjuvant. The petroleum-based adjuvant may include a mixture of alicyclic hydrocarbons ranging from C17 to C29 and a hydro-treated heavy naphthenic distillate. The herbicide-adjuvant composition may include a viscosity modifier. Also disclosed are granules coated in a herbicide-adjuvant composition. The granule may be a fertilizer granule or a carrier granule. A method of controlling a weed plant including spreading a plurality of granules coated with a herbicide-adjuvant composition on the weed plant. The phenoxy-based herbicide and the petroleum-based adjuvant are spread on the weed plant in a single step.

17 Claims, 2 Drawing Sheets

200 μm    ELECTRON IMAGE 1

Figure 1:
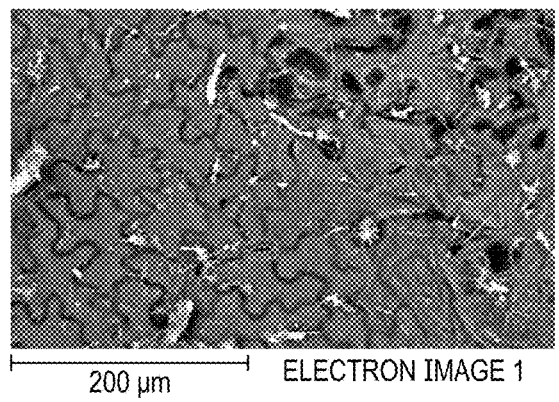

(51) Int. Cl.
*C05C 9/00* (2006.01)
*C05G 3/60* (2020.01)
*C05G 5/12* (2020.01)

(56) References Cited

OTHER PUBLICATIONS

International Search Report and Written Opinion of the International Searching Authority for International Patent App. No. PCT/US2021/023202 dated Jun. 8, 2021 (8 pages).

COMPOSITIONS AND METHODS FOR FORMULATING MOLTEN PETROLEUM ADJUVANTS TO IMPROVE HERBICIDAL UP-TAKE IN WEED PLANTS

CROSS-REFERENCE TO RELATED APPLICATIONS

The present application claims the priority benefit of U.S. Provisional Patent App. Ser. No. 62/992,218, filed Mar. 20, 2020, which is incorporated by reference herein in its entirety.

TECHNICAL FIELD

The present disclosure relates generally to molten petroleum adjuvants and methods of making molten petroleum adjuvants. The molten petroleum adjuvants improve herbicidal up-take in weed plants.

BACKGROUND

Granular weed control products utilized in the consumer lawns industry typically include systemic herbicides such as 2,4-D, MCPP-p, and dicamba for foliar application to broadleaf post-emergent weeds. The active ingredients are generally applied to granular inert carriers or fertilizer granules as a tack-on powder or in a liquid form. Normally, the resulting granular materials are then applied to a broadleaf weed plant using a broadcast spreader to spread the granules to the leaf surface. The particles adhere to the moist foliage in order to solubilize the active ingredient, thus allowing it to enter the weed cells and kill the plant.

Most weed plants have a protective waxy cuticle layer that prevents water soluble active ingredients or other materials from entering its cell structure. Crop oil concentrates (COC) and vegetable oils (e.g., methylated seed oil, MSO) are petroleum-based adjuvants classified as penetrants. This type of adjuvant can improve cuticular penetration by softening, plasticizing, or dissolving cuticular waxes and allowing herbicide movement into the more hydrophilic cell regions underneath the cuticle. The application of crop oil concentrates or vegetable oils are accomplished using a liquid solution. This action improves the effectiveness of the herbicide and can result in reduced herbicide application rates overall. It is desirable to provide molten petroleum-based adjuvants that improve herbicidal up-take in weed plants and reduce the time and labor cost of applying the adjuvant and the herbicide.

SUMMARY

According to one embodiment, a herbicide-adjuvant composition includes a phenoxy-based herbicide and a petroleum-based adjuvant. The petroleum-based adjuvant may include a mixture of alicyclic hydrocarbons ranging from C17 to C29 and a hydro-treated heavy naphthenic distillate. The herbicide-adjuvant composition may include a viscosity modifier.

According to another embodiment, a granule is coated in a herbicide-adjuvant composition. The granule may be a fertilizer granule or a carrier granule.

According to another embodiment, a method of making a herbicide-adjuvant composition includes mixing the phenoxy-based herbicide and a petroleum-based adjuvant to form a solution. The mixing may occur at a temperature in a range from 200° F. to 280° F.

According to another embodiment, a method of making a granule includes coating the granule with the herbicide-adjuvant composition.

According to another embodiment, a method of controlling a weed plant includes spreading a plurality of granules coated with a herbicide-adjuvant composition on the weed plant. The phenoxy-based herbicide and the petroleum-based adjuvant are spread on the weed plant in a single step.

BRIEF DESCRIPTION OF THE DRAWINGS

The above-mentioned and other features and advantages of the present disclosure, and the manner of attaining them, will become more apparent and the disclosure itself will be better understood by reference to the following description of non-limiting embodiments of the disclosure taken in conjunction with the accompanying drawings, wherein:

FIG. 1 is a backscatter detection image of an example composition according to an embodiment.

FIG. 2 is an elemental map of an example composition according to an embodiment.

FIG. 3 is a chart depicting the estimated translocation level of chlorine for an example composition according to an embodiment, a comparative composition including an herbicide treatment, and a control composition.

FIG. 4 is a graph depicting the percentage of dandelion control at one month after application.

FIG. 5 shows electron images and elemental maps for both a comparative composition and an inventive composition according to an embodiment.

DETAILED DESCRIPTION

Compositions and methods for formulating molten petroleum adjuvants are described herein. The present compositions and methods include combining the herbicide and adjuvant in one manufacturing step without the use of solvents or tank solutions. Fertilizer or carrier granules coated with an herbicide-adjuvant coating are also described herein. Therefore, a granular herbicide and a performance-enhancing penetrant may be applied to a plant without the need for separate application steps. The present compositions and methods reduce consumer application cost, while increasing herbicide effectiveness and ease of use.

Embodiments of a herbicide-adjuvant composition comprise a phenoxy-based herbicide and a petroleum-based adjuvant. The phenoxy-based herbicide includes, for example, 2,4-dichlorophenoxyacetic acid (2,4-D), (2R)-2-(4-chloro-2-methylphenoxy)propanoic acid (MCPP-p), 3,6-dichloro-2-methoxybenzoic acid (dicamba), and mixtures thereof. The herbicide-adjuvant composition may contain from about 5% to about 25%, about 10% to about 20%, by weight, of the petroleum-based adjuvant. In certain embodiments, the herbicide-adjuvant composition may contain 79% 2,4-D, 6% dicamba, and 15% adjuvant, by weight. Additionally, in certain embodiments, the herbicide-adjuvant composition may contain from about 50% to about 95% herbicide. In addition or alternative to the phenoxy-based herbicide, a composition may comprise a natural or plant-based derivative. Suitable derivatives include, without limitation, abietic acid, levopimaric acid, pimaric acid, dehydroabietic acid, dihydroabietic acid, rosin derivatives, pine wood resin derivatives, or combinations thereof.

Embodiments of the petroleum-based adjuvant include a mixture of alicyclic hydrocarbons ranging from C17 to C29 and a hydro-treated heavy naphthenic distillate. The alicyclic hydrocarbons include a mixture of tricyclic, tetracyclic, and pentacyclic naphthenic compounds (structures shown below). An example of a commercially available petroleum-based adjuvant includes DUSTROL® 3088 manufactured and sold by ARR-MAZ Custom Chemicals, Inc., of Mulberry, Fla.

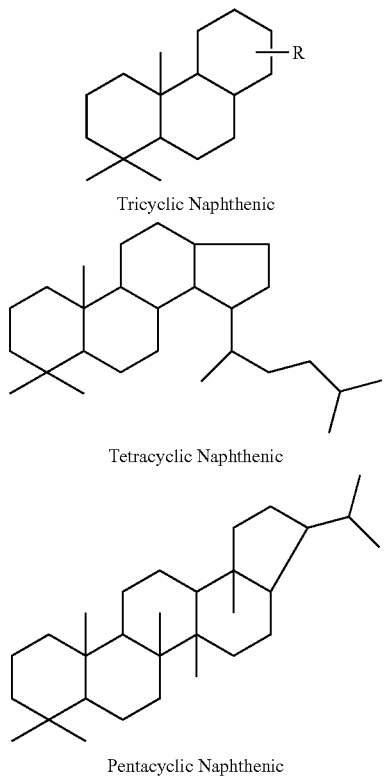

Tricyclic Naphthenic

Tetracyclic Naphthenic

Pentacyclic Naphthenic

In certain embodiments, the petroleum-based adjuvant includes the alicyclic hydrocarbons in a range from about 50% to about 95%, by weight, and the hydro-treated heavy naphthenic distillate in a range from about 5% to about 50%, by weight. The overall molecular weight of the petroleum-based adjuvant is such that it is a semi-solid at room temperature (e.g., 65-80° F.). However, at elevated temperatures (e.g., 250° F. to 280° F.), the petroleum-based adjuvant has a viscosity of about 150 centipoise or less, and a flash point of about 300° F. or greater. The hydro-treated heavy naphthenic distillate provides the petroleum-based adjuvant with an aromaticity in a range from about 1% to about 4%. The low level of aromatic content allows the petroleum-based adjuvant to have good safety profile. Additionally, this level of aromatic content is sufficiently large enough to allow the petroleum-based adjuvant to be an effective solvent for phenoxy-based herbicides like 2,4-D, MCPP-p, and dicamba.

In certain embodiments, the herbicide-adjuvant composition includes a modifier or surfactant. For example, a viscosity modifier, such as dipropylene glycol (DPG), may be added to the herbicide-adjuvant composition. A viscosity modifier allows for a lower processing temperature, which reduces the possibility of the herbicide decomposing during the mixing process. For example, in certain embodiments, the flash point of the viscosity modifier is 240° F. or greater. Additionally, a viscosity modifier may improve active ingredient (AI) distribution on the surface of the granule. In certain embodiments, the herbicide-adjuvant composition may include about 24%, by weight, of a viscosity modifier.

Embodiments of making the herbicide-adjuvant composition include mixing a phenoxy-based herbicide and petroleum-based adjuvant at an elevated processing temperature. Such an elevated processing temperature may, for example, range from 200° F. to 280° F. The processing temperature may vary depending on the ratio of herbicide to adjuvant and whether the composition includes a modifier. The phenoxy-based herbicide dissolves into solution with the petroleum-based adjuvant. The herbicide-adjuvant solution may then be applied to the surface of a fertilizer or carrier granule. The solution solidifies as a coating when cooled (e.g., to room temperature).

In use, the herbicide-adjuvant coated granules are applied to moistened weed leaves, and the herbicide and adjuvant disperse. The solvent properties of the adjuvant help to increase the percentage of active ingredient dispersing from the coated granule. The adjuvant softens the cuticle layer allowing higher concentrations of herbicide to enter the leaf cell structure and translocate with the plant. The result of higher active ingredient translocation is a greater percentage of weeds kills compared to herbicides formulated without the adjuvant.

Example 1

Herbicide Adjuvant Composition. A laboratory scale batch of a typical phenoxy-based herbicide melt was prepared. DUSTROL® 3088 was first added to an agitated vessel and heated to 265° F. Once the DUSTROL® 3088 reached the target temperature, 2,4-D was mixed in slowly while maintaining a temperature in a range from 265° F. to 270° F. Once the 2,4-D was completely added, the dicamba was added to the vessel at a rate that maintained the temperature in a range from 265° F. to 270° F. Once the dicamba was completely added, the solution was heated to about 275° F. and held for ten minutes. This initial solution contained 15% adjuvant (DUSTROL® 3088), 79% 2,4-D composition (97% purity), and 6% dicamba composition (92% purity), by weight. Approximately 200 grams of the finished solution was prepared in this batch.

The molten solution was then spray applied to a fertilizer base in a batch blender to create a final herbicide concentration of 1.21% 2,4-D (active ingredient) and 0.08% dicamba (active ingredient). The fertilizer base had a NPK ratio of 28-0-3. The final product was then cooled and placed in a storage bag.

Effectiveness Comparison. The effectiveness of the herbicide-adjuvant coated fertilizer of delivering the active ingredient into the weed leaf was compared to that of a fertilizer substrate treated with herbicide without the target adjuvant. Three groups of two dandelion plants were grown under greenhouse conditions. The first group was the control with fertilizer granules but no herbicide or adjuvant treatment ("Control Example"). The second group was treated with a fertilizer and herbicide containing 1.21% 2,4-D and 0.61% MCPP-p but with no adjuvant at a rate of 1.5 lb of 2,4-D per acre ("Comparative Example 1"). The third group was treated with the herbicide-adjuvant coated fertilizer granules described above at a rate of 1.5 lb of 2,4-D per acre ("Inventive Example 1"). The fertilizer for each of these Examples had a NPK ratio of 28-0-3. The granules were applied to pre-moistened dandelion leaf surfaces in each of the groups. Each of the groups, including the control, was held in the greenhouse for about 40 hours after treatment to allow for initial translocation of the herbicide into the dandelion cell structure.

Following the 40-hour hold period, specimen samples of about 1 cm² were taken from each dandelion plant using the following protocol. First, each dandelion plant was observed for visual indication of particle dissolution areas on the surface of the leaf. A specimen sample was taken only from an observed dissolution area, in order to reduce any artifacts from differences in number of particles adhering to the leaf surface. Each specimen was provided an additional hydration source, placed into a scanning electron microscopy (SEM) chamber, and cooled to a temperature of −27° C. and a pressure of 50 Pa. An accelerating voltage of 21 kV was used to achieve penetration of the electron beam below the surface of the leaf. The depth of electron beam penetration triggers an X-ray photon having a critical excitation energy, which is atomic number dependent, at a significantly greater depth. The X-ray escape depth was estimated using the Anderson and Hasler derived expression, which useful for most elements:

$$R_x = \frac{0.064}{\rho}(E_0^{1.68} - E_c^{1.68})$$

where $R_x$ is the X-ray escape depth and has units of µm, $E_0$ is the accelerating voltage of 21 kV, $E_c$ is the critical excitation energy for chlorine (Cl) of 2.824 kV, and p is the leaf specific gravity estimated to be 1.0 gm/cm³. Given these values, the penetration or X-ray escape depth was projected to be about 10.3 µm, with a leaf thickness estimated to be about 20-30 µm. Chlorine was selected as a target element due its inclusion in the composition of each of the herbicide compounds.

Figure 2:
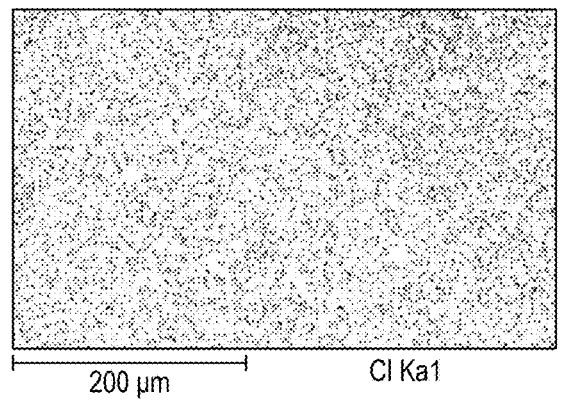

The electron images were then scanned using a backscatter detector and 850× magnification, as well as an energy dispersive X-ray spectroscopy (EDS) detector. Examples of the backscatter detect image are shown in FIG. 1, where the surface cell structure is clearly visible along with some small surface crystals distributed around the area. If any large un-dissolved particles were in the sample specimen area, these were removed from the surface before placing in to the SEM chamber. Using the EDS detector, an elemental map was developed showing the subsurface location of elemental chlorine. This map provides the best projection of the chlorine translocation degree, or essentially how much active ingredient is getting into the plant following the 40-hour hold time. An example of this elemental map is shown in FIG. 2, where the green coloring indicates a relatively uniform distribution of chlorine in the image area.

Figure 3:
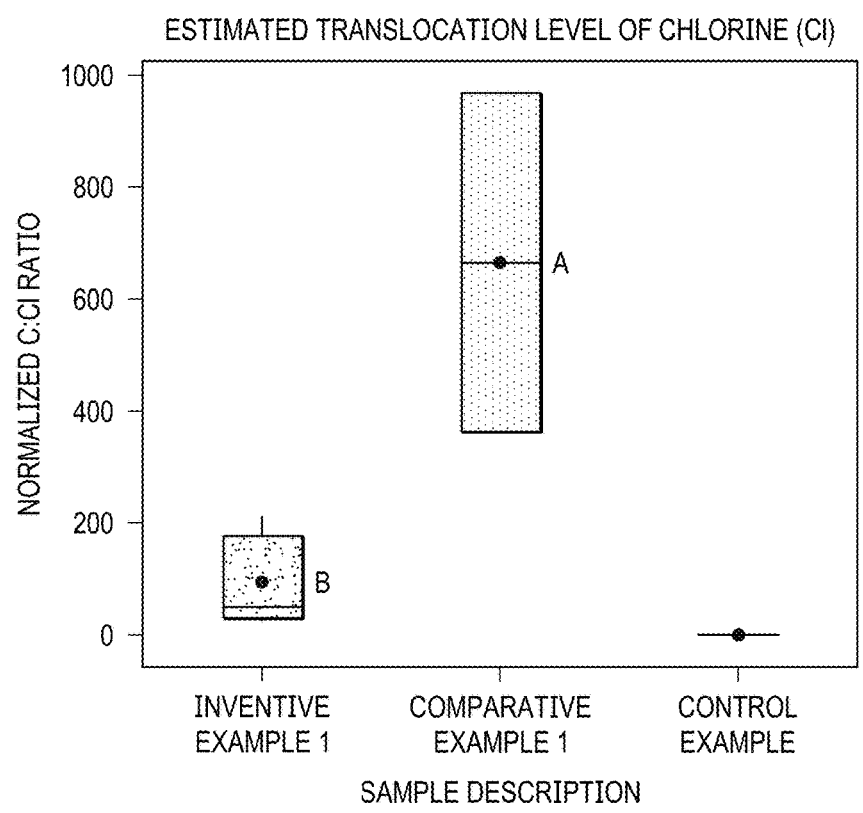

Finally, using the quantitative analysis capability of the EDS system, the projected weight percentage of chlorine can be calculated from the elemental map information. To ensure each chlorine weight percentage was estimated using a similar basis, the chlorine concentration was calculated as a ratio of the carbon concentration (C:Cl), since the number and size of plant cells varied from image to image. In addition, because plants can take up chlorine containing compounds from the soil, we measured the chlorine content from the control group and used those values to normalize the data. The results of these comparisons, shown in FIG. 3, indicate the sample specimen from Inventive Example 1 had a significantly lower C:Cl ratio, with a mean value of 89.9, versus Comparative Example 1, which had a C:Cl ratio mean value of 663.3. The lower the C:Cl ratio for a given sample area is, the higher the chlorine concentration is in that sample. Thus, more chlorine, and consequently more herbicide, entered the plant cells in the Inventive Example 1 compared to the Comparative Example 1.

Example 2

Two herbicide control efficacy trials were conducted comparing a methyleneurea based fertilizer with added herbicide (Comparative Example 1) and a fertilizer with added herbicide and adjuvant ("Inventive Example 2"). The adjuvant in Inventive Example 2 is the same as in Inventive Example 1. The fertilizer application rate for both materials was 0.8 lb nitrogen per 1,000 square feet. The herbicide rate for both materials was 1.5 lb/acre of 2,4-D. Comparative Example 1 contained 0.75 lb/acre of MCPP-p, and Inventive Example 2 contained 0.1 lb/acre of dicamba. Therefore, Inventive Example 2 has about 30% less herbicide when compared to Comparative Example 1. The materials were applied to a Kentucky bluegrass area infested with dandelions (*Taraxacum officinale*).

Figure 4:
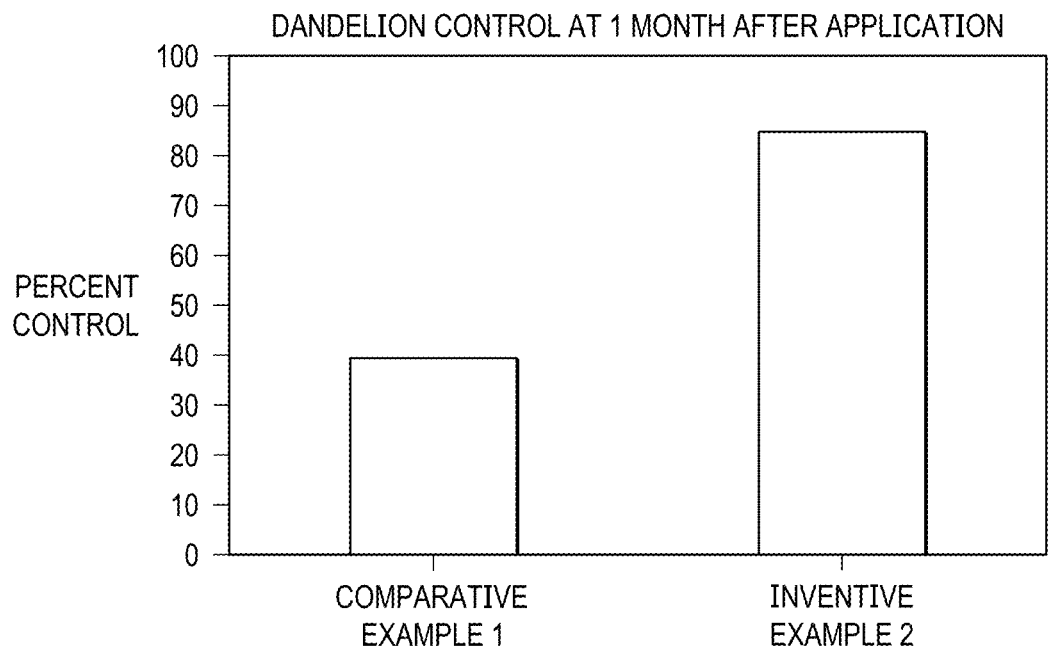

The treatments were weighed in grams prior to application to maintain accurate product delivery rate and applied using a standardized screen distribution box which covered each test plot area. All treatments were applied on dew moistened foliage. FIG. 4 shows the results of trials conducted to determine dandelion control. All trials were replicated and weed control evaluations were conducted one month after application.

The results indicate the Inventive Example 2 controlled dandelions at a rate equal to or better than the Comparative Example 1, while using about 30% less active ingredient.

Example 3

Investigations indicated that while heating a 2,4-D, dicamba, and 15% DUSTROL® mixture to 275° F. creates an effective weed control product, inconsistencies in weed control can develop due to the high processing temperature. When processed at temperatures at or above 275° F., the 2,4-D can undergo some decomposition leading to lower solubility of the active ingredient. The decrease in solubility of 2,4-D will reduce up-take by the plant and generate wider weed control variations.

Figure 5:
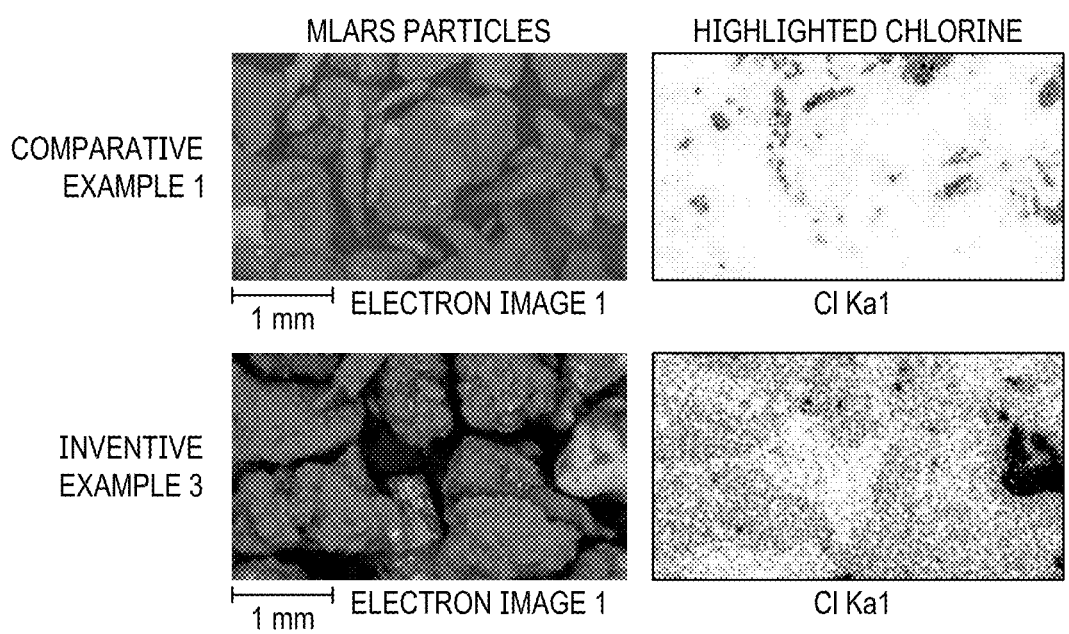

To improve consistency of product performance, increasing the DUSTROL® to 24% and including a viscosity modifier, dipropylene glycol (DPG), at a level of 24% allows the processing temperature to be decreased to 200° F. Inventive Example 3 included the fertilizer base, 48.4% 2,4-D, 3.2% dicamba, 24% DUSTROL®, and 24% DPG. The combination of 24% DUSTROL® and 24% DPG with a 200° F. processing temperature eliminates the decomposition issue and also improves active ingredient distribution on the surface of the granule. FIG. 5 shows a comparison between Comparative Example 1, produced using the process utilizing a higher temperature, and Inventive Example 3 processed at a lower temperature and formulated with 24% DUSTROL® and 24% DPG. In FIG. 5, which shows the average of data from two trials, the light blue area denotes elemental chlorine which also indicates the presence of 2,4-D. The greater coverage of light blue on the DUSTROL®/DPG sample suggest greater distribution of 2,4-D around the particle.

Using the SEM/EDS method described in Example 1, field grown dandelion plants were treated with a fertilizer containing 1.21% 2,4-D and 0.61% MCPP-p herbicide with no adjuvant ("Comparative Example 1") at a rate of 1.5 lb/acre of 2,4-D. The second group was treated with a fertilizer containing 1.21% 2,4-D, 0.08% dicamba, and the adjuvant combination of DUSTROL® and DPG ("Inventive Example 3"). The third group was the control and had no herbicide treatment ("Control Example"). The results from the SEM/EDS analysis are displayed in Table 1.

TABLE 1

| Sample | C:Cl Ratio |
|---|---|
| Control Example | 165.913 a* |
| Comparative Example 1 | 161.387 a |
| Inventive Example 3 | 98.900 b |

*The letters indicate statistical difference using a mean separation test; the same letters indicate no statistical difference.

The results consistently show the Inventive Example 3 has the lowest C:Cl ratio, which indicates there is more chlorine present in the sample.

Example 4

Selected test turf plots were treated with a fertilizer containing 1.21% 2,4-D and 0.61% MCPP-p herbicide without adjuvant (Comparative Example 1) at a rate of 1.5 lb/acre of 2,4-D; a fertilizer containing 1.21% 2,4-D, 0.08% dicamba, and 15% DUSTROL® (Inventive Example 1) at a rate of 1.5 lb/acre of 2,4-D; a fertilizer containing 1.21% 2,4-D, 0.08% dicamba, 24% DUSTROL® and 24% DPG (Inventive Example 3) at a rate of 1.5 lb/acre of 2,4-D; and another treatment was the control without herbicide applied. The results are shown in Table 2 below.

TABLE 2

| | Days after Application | | | |
|---|---|---|---|---|
| | 3 | 8 | 17 | 31 |
| Sample | Dandelion Injury | | | |
| Comparative Example 1 | 1.3 b | 3.3 ab | 4.3 ab | 93.8 a |
| Inventive Example 1 | 0.0 d | 2.8 be | 4.0 b | 90.8 ab |
| Inventive Example 3 | 2.0 a | 3.5 a | 5.5 a | 97.5 a |
| Control Example | 0.5 cd | 0.0 d | 0.0 d | 0.0 c |

The results show that formulation for Inventive Example 3 had the highest rated dandelion injury after three days, which suggests this formulation may be faster at penetrating the leaf surface. The advantage of faster leaf penetration is that more active ingredient can be taken up by the plant before wind or rain or foot traffic can knock the particle off the leaf surface. This leads to great application consistency and performance.

As used herein, all percentages (%) are percent by weight of the total composition, also expressed as weight/weight %, % (w/w), w/w, w/w % or simply %, unless otherwise indicated.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. An herbicide-adjuvant composition, the composition comprising:
   a phenoxy-based herbicide;
   a petroleum-based adjuvant; and
   wherein the petroleum-based adjuvant comprises a mixture of alicyclic hydrocarbons ranging from C17 to C29 and a hydro-treated heavy naphthenic distillate.

2. The composition of claim 1, wherein the composition comprises the petroleum-based adjuvant in a range from about 10% to about 20%, by weight.

3. The composition of claim 1, wherein the herbicide comprises at least one of 2,4-dichlorophenoxyacetic acid (2,4-D), (2R)-2-(4-chloro-2-methylphenoxy)propanoic acid (MCPP-p), or 3,6-dichloro-2-methoxybenzoic acid (dicamba).

4. The composition of claim 1, wherein the mixture of alicyclic hydrocarbons comprises a mixture of tricyclic, tetracyclic, and pentacyclic naphthenic compounds.

5. The composition of claim 1, wherein the petroleum-based adjuvant comprises the alicyclic hydrocarbons in a range from about 50% to about 95%, by weight, and the hydro-treated heavy naphthenic distillate in a range from about 5% to about 50%, by weight.

6. The composition of claim 1, wherein the petroleum-based adjuvant has an aromaticity in a range from about 1% to about 4%.

7. The composition of claim 1, wherein, at a temperature in a range from 250° F. to 280° F., the petroleum-based adjuvant has a viscosity of about 150 centipoise or less and a flash point of about 300° F. or greater.

8. The composition of claim 1, further comprising a viscosity modifier.

9. The composition of claim 8, wherein the viscosity modifier is dipropylene glycol.

10. A granule coated in the composition of claim 1.

11. The granule of claim 10, wherein the granule is a fertilizer granule.

12. The granule of claim 10, wherein the granule is a carrier granule.

13. A method of making a granule, the method comprising coating the granule with the composition of claim 1.

14. A method of making the composition of claim 1, the method comprising:
   mixing the phenoxy-based herbicide and a petroleum-based adjuvant to form a solution.

15. The method of claim 14, wherein the mixing occurs at a temperature in a range from 200° F. to 280° F.

16. The method of controlling a weed plant, the method comprising:
   spreading a plurality of the granules of claim 10 on the weed plant,
   wherein the phenoxy-based herbicide and the petroleum-based adjuvant are spread on the weed plant in a single step.

17. The method of claim 16, wherein at least a portion of the plurality of the granules comprise a fertilizer, and wherein the fertilizer, the phenoxy-based herbicide, and the petroleum-based adjuvant are spread on the weed plant in a single step.

* * * * *